US008903822B2

(12) United States Patent (10) Patent No.: US 8,903,822 B2
Shin (45) Date of Patent: Dec. 2, 2014

(54) APPARATUS AND METHOD FOR MEASURING CONTENTS SIMILARITY BASED ON FEEDBACK INFORMATION OF RANKED USER AND COMPUTER READABLE RECORDING MEDIUM STORING PROGRAM THEREOF

(75) Inventor: Hyoseop Shin, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 111 days.

(21) Appl. No.: 13/084,730

(22) Filed: Apr. 12, 2011

(65) Prior Publication Data

US 2011/0252044 A1 Oct. 13, 2011

(30) Foreign Application Priority Data

Apr. 13, 2010 (KR) .................. 10-2010-0033961

(51) Int. Cl.
*G06F 17/30* (2006.01)
(52) U.S. Cl.
CPC ............................. *G06F 17/30699* (2013.01)
USPC ............ 707/736; 707/737; 707/748; 707/749
(58) Field of Classification Search
USPC .................................. 707/736, 737, 748, 749
See application file for complete search history.

(56) References Cited

U.S. PATENT DOCUMENTS

| | | | |
|---|---|---|---|
| 7,219,035 B2 * | 5/2007 | Goodman ...................... | 702/181 |
| 7,526,100 B1 * | 4/2009 | Hartman et al. .............. | 382/103 |
| 8,032,480 B2 * | 10/2011 | Pinckney et al. .............. | 706/62 |
| 8,170,897 B1 * | 5/2012 | Cohen et al. .................. | 705/7.13 |
| 8,214,375 B2 * | 7/2012 | Fitzmaurice et al. ......... | 707/749 |
| 8,311,792 B1 * | 11/2012 | Podgorny et al. .............. | 703/13 |
| 8,620,900 B2 * | 12/2013 | Luk ............................... | 707/715 |
| 8,676,815 B2 * | 3/2014 | Deng et al. ..................... | 707/749 |
| 2003/0037041 A1 * | 2/2003 | Hertz ............................ | 707/1 |
| 2007/0208730 A1 | 9/2007 | Agichtein et al. | |
| 2007/0226296 A1 * | 9/2007 | Lowrance et al. ............. | 709/204 |
| 2008/0140616 A1 * | 6/2008 | Encina et al. .................. | 707/3 |
| 2008/0162528 A1 * | 7/2008 | Jariwala ....................... | 707/102 |

(Continued)

FOREIGN PATENT DOCUMENTS

KR 10-2007-0091834 9/2007
KR 10-2008-0017685 2/2008

(Continued)

OTHER PUBLICATIONS

USPTO translation of Kim, J.H. et al. "The Bolg-Rank algorithm for the effective blog search." In 2008 Autumn Conference, Kisse 2008, vol. 35, pp. 93-94, Oct. 1, 2008.*

(Continued)

*Primary Examiner* — Hanh Thai
(74) *Attorney, Agent, or Firm* — Bacon & Thomas, PLLC

(57) ABSTRACT

An apparatus for measuring contents similarity based on feedback information from ranked users includes: a user ranking unit for receiving from a database information on users as contents creators and feedback information on contents and ranking the users based on the received information; and a user grouping unit for classifying the users into a plurality of groups based on the ranking result. The apparatus further includes: a sequence modeling unit for receiving from the database the contents and the feedback information and modeling the number of feedbacks as sequences based on the ranked user groups; and a post similarity calculation unit for measuring similarity between the modeled sequences.

19 Claims, 7 Drawing Sheets

(56) References Cited

U.S. PATENT DOCUMENTS

| | | | |
|---|---|---|---|
| 2008/0294584 A1* | 11/2008 | Herz | 706/46 |
| 2009/0234878 A1* | 9/2009 | Herz et al. | 707/102 |
| 2010/0030578 A1* | 2/2010 | Siddique et al. | 705/3 |
| 2010/0205123 A1* | 8/2010 | Sculley et al. | 706/12 |
| 2010/0241698 A1* | 9/2010 | Hillerbrand | 709/203 |
| 2010/0332301 A1* | 12/2010 | Higgins et al. | 705/14.11 |
| 2010/0332304 A1* | 12/2010 | Higgins et al. | 705/14.16 |
| 2011/0035345 A1* | 2/2011 | Duan et al. | 706/12 |
| 2011/0276507 A1* | 11/2011 | O'Malley | 705/321 |
| 2012/0143802 A1* | 6/2012 | Balakrishnan et al. | 706/14 |
| 2013/0226674 A1* | 8/2013 | Field et al. | 705/7.38 |
| 2014/0040176 A1* | 2/2014 | Balakrishnan et al. | 706/14 |

FOREIGN PATENT DOCUMENTS

| | | |
|---|---|---|
| KR | 10-2008-0114708 | 12/2008 |
| KR | 10-2011-0080838 | 7/2011 |
| WO | 2008/023904 | 2/2008 |

OTHER PUBLICATIONS

Hyoseop Shin et al., "Separating the Reputation and the Sociability of Online Community Users", Proceedings of the 2010 ACM Symposium on Applied Computing, Sierre, Switzerland, Mar. 22-26, 2010.

* cited by examiner

APPARATUS AND METHOD FOR MEASURING CONTENTS SIMILARITY BASED ON FEEDBACK INFORMATION OF RANKED USER AND COMPUTER READABLE RECORDING MEDIUM STORING PROGRAM THEREOF

FIELD OF THE INVENTION

The present invention relates to an apparatus and a method for measuring contents similarity based on feedback information of ranked users and a computer readable recording medium storing a program thereof. Specifically, the present invention relates to a technique for measuring similarity between posts by modeling a random post based on preference tendency of each ranked user.

BACKGROUND OF THE INVENTION

In general, users can create user-generated contents and publish the created contents to other users on an online network such as an online community, a blog, a social network or the like on the internet.

Further, a technique for ranking various posts based on predetermined criteria and searching a desired post has been developed along with the development of the posts and the contents technique. A document ranking technique is used to search a desired post based on the ranking. A conventional document ranking technique is classified into a keyword-based document ranking technique and a document ranking technique using link analysis between web documents.

The keyword-based document ranking technique includes a TF-IDF (Term Frequency-Inverse Document Frequency) technique developed based on a conventional information retrieval theory. This technique utilizes a term frequency in a document and an inverse document frequency of a document frequency including terms.

Meanwhile, the document ranking technique using link analysis between web documents includes a page rank technique for computing rank scores of web documents by analyzing a reciprocal link relationship between the web documents and a HITS (Hyperlink-Induced Topic Search) technique for calculating an authority score and a hub score of each document by analyzing a reciprocal link relationship based on a web document search result.

Meanwhile, users can leave feedbacks on published posts. For example, the users' feedbacks on the posts include read or view, comment, reply, favorite, evaluation and the like.

Here, it should be noted that a post with feedbacks from users shows the users' tendency. For example, high-ranked users of high expertise tend to prefer high expertise posts and give feedbacks on such posts, whereas middle- or low-ranked users of low expertise tend to prefer commercial posts compared to high expertise posts and give feedbacks on such posts. When users read movie posts or image posts, movies or images that are artistic and professional receive high scores from experts of the related area, whereas movies or images that are fun are preferred by the public and receive feedbacks therefrom. In other words, a post preference tendency is different in accordance with user ranks.

FIGS. 1A to 1C show feedback graphs on three posts preferred by different user groups.

Referring to FIGS. 1A to 1C showing the three posts preferred by different user groups, the x-axis indicates user groups, and the y-axis indicates preference of the user groups. A high value in the x-axis indicates a low user group, and a high value in the y-axis indicates high preference.

The post graph of FIG. 1A shows that the corresponding post is relatively preferred by the low-ranked user group; the post graph of FIG. 1B shows the corresponding post is preferred by the middle-ranked user group; and the post graph of FIG. 1C shows that the corresponding post is preferred by the high-ranked user group.

As described above, in the conventional user contents classification method, the user group basis preference posts can be classified based on the users' expertise and reputation measured by the feedbacks on the posts. However, it is difficult to accurately measure similarity between the posts based on the feedbacks.

SUMMARY OF THE INVENTION

In view of the above, the present invention provides an apparatus and a method for measuring contents similarity by modeling a random post as a sequence based on preference tendency of each ranked user, and a computer readable recording medium storing a program thereof.

In accordance with an aspect of the present invention, there is provided an apparatus for measuring contents similarity based on feedback information from ranked users. The apparatus includes: a user ranking unit for receiving from a database information on users as contents creators and feedback information on contents and ranking the users based on the received information; a user grouping unit for classifying the users into a plurality of groups based on the ranking result; a sequence modeling unit for receiving from the database the contents and the feedback information and modeling the number of feedbacks as sequences based on the ranked user groups; and a post similarity calculation unit for measuring similarity between the modeled sequences.

In accordance with another aspect of the present invention, there is provided a method for measuring contents similarity based on feedback information of a ranked user. The method includes: receiving information on user as contents creators and feedback information on contents from a database of a contents similarity measuring apparatus and ranking the users based on the received information; classifying the users into a plurality of groups based on the ranking result; receiving the contents and the feedback information received from the database and modeling the number of feedbacks as sequences based on the ranked user groups; and measuring similarity between the modeled sequences.

The representative effects of the present invention are described as follows.

The present invention can model a user's post based on feedback information of ranked users and measure similarity between posts. Therefore, retrieval of similar posts, post clustering, and contents classification can be carried out.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Hereinafter, an embodiment of the present invention will be described in detail with reference to accompanying drawings which form a part hereof.

Figure 1A:
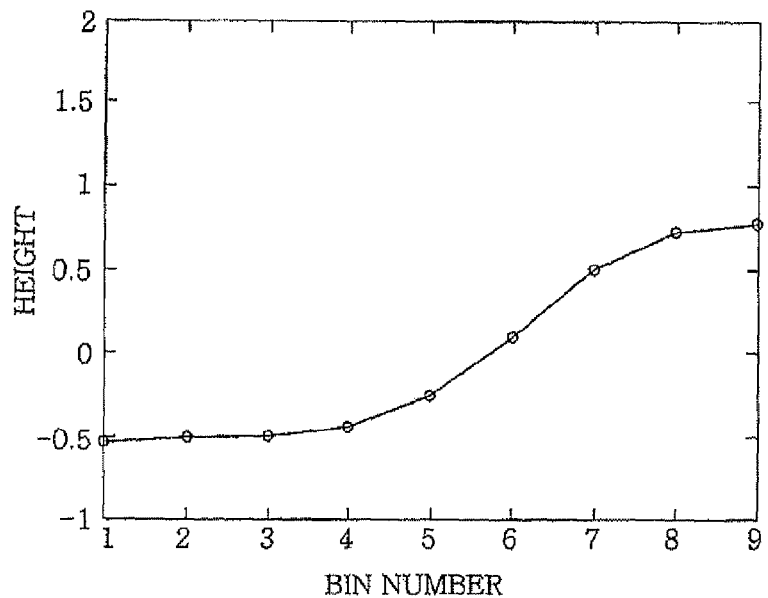
FIGS. 1A to 1C show feedback graphs on three posts preferred by different user groups.
Figure 1B:
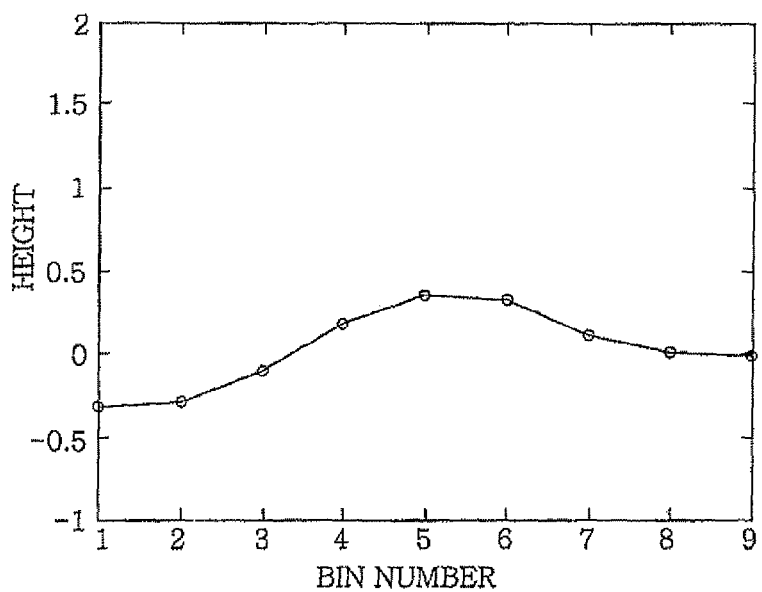
Figure 1C:
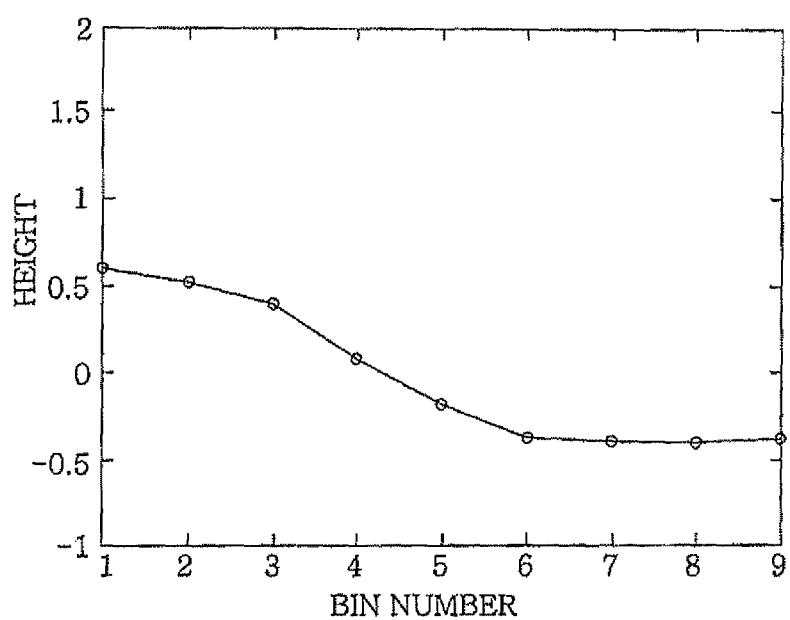
Figure 2:
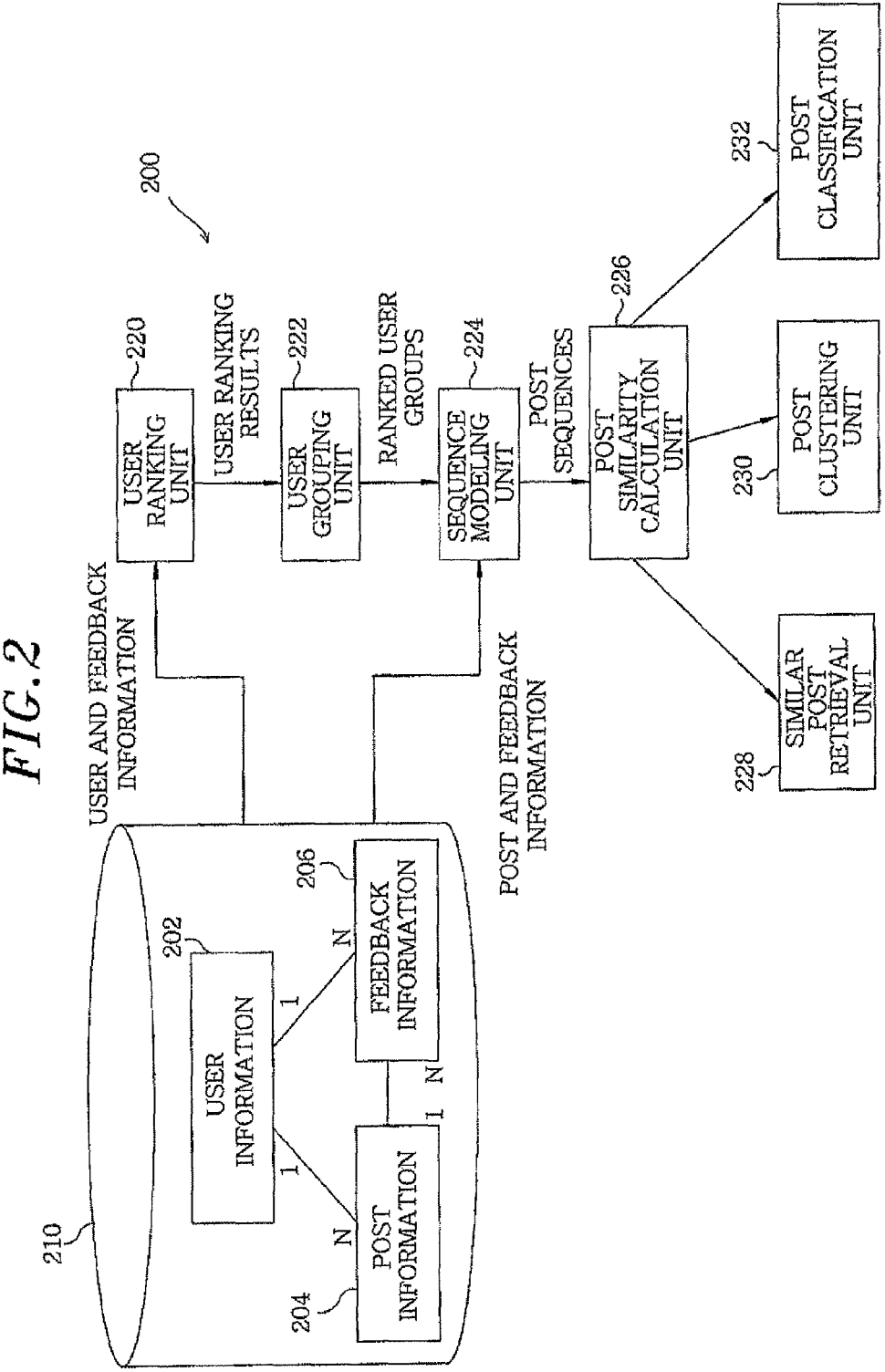
FIG. 2 is a block diagram showing a structure of a contents similarity measuring apparatus in accordance with an embodiment of the present invention.

FIG. 2 is a block diagram showing a configuration of a contents similarity measuring apparatus 200 in accordance with an embodiment of the present invention.

Referring to FIG. 2, a user generates contents such as a post on an online network by using various computing devices including a mobile terminal, a desk top and the like which interwork via a wire/wireless communication network. The contents similarity measuring apparatus 200 measures contents similarity based on the created contents, information on the user who created contents, and the feedback information on the created contents.

The contents similarity measuring apparatus 200 includes: a database 210 having data groups such as user information 202, post information 204, feedback information 206 and the like; a user ranking unit 220 for ranking all users; a user grouping unit 222 for classifying user groups into various groups based on the user ranking result; a sequence modeling unit 224 for modeling the number of feedbacks on each post as a sequence on the ranked user group basis; and a post similarity calculation unit 226 for measuring similarity between sequences.

The contents similarity measuring apparatus 200 further includes a similar post retrieval unit 228 which utilizes the post similarity obtained by the post similarity calculation unit 226, a post clustering unit 230, a post classification unit 232 and the like.

A user's reputation or expertise on an online network such as an online community, a blog, a social network or the like is determined by online activities such as writing posts, giving feedbacks to posts or the like. For example, when a user's post receives feedbacks from other users, the user's reputation is increased by the feedbacks from other users. Further, the user's score which can be measured based on the reputation is also increased.

At this time, the user's reputation can be even more increased when a feedback is made from a user having high reputation than from a user having low reputation. Therefore, the user ranking unit 220 applies a random walk-based user ranking algorithm or a HITS algorithm to the user ranking calculation.

Prior to explanation of the user ranking algorithms, the graph models of the online activities between users will be defined.

Figure 3A:
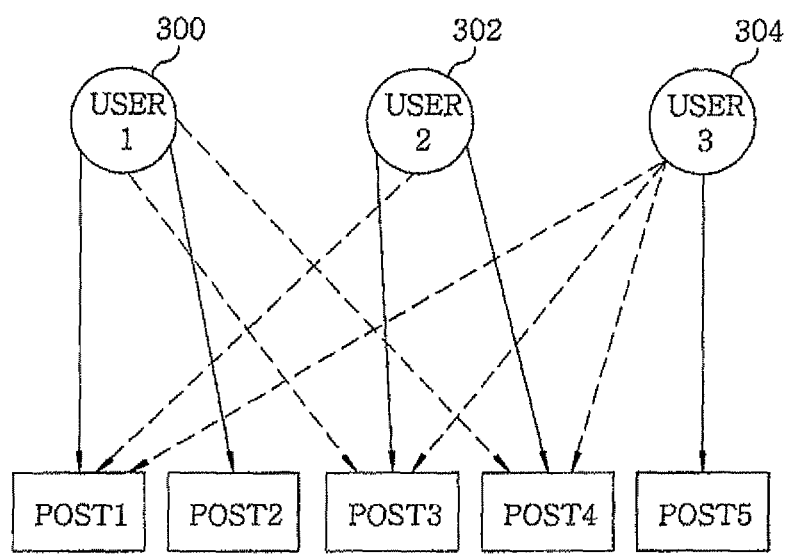
FIGS. 3A and 3B show user-generated graphs and users' online activities in accordance with an embodiment of the present invention.
Figure 3B:
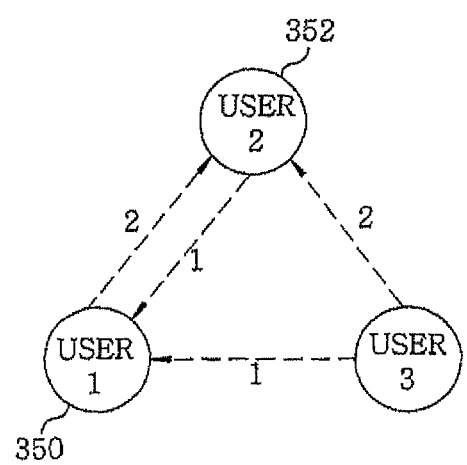

FIGS. 3A to 3B show users' online interactions and a graph model thereof in accordance with an embodiment of the present invention.

The users' online interaction such as posting contents or giving feedbacks to a certain post can be expressed in a user-contents graph shown in FIG. 3A. In this graph, nodes represent users and posts, and edges between the users and the posts represent activities such as creating posts or giving feedbacks to posts. For example, a user 1 creates posts 1 and 2 (solid lines), and the post 1 receives feedbacks from a user 2 and a user 3 (dotted lines).

The user-post graph can be abstracted as the graph model of the user interactions shown in FIG. 3B. Here, edges between nodes indicate the number of feedbacks exchanged between the users. For example, the user 1 receives one feedback from the user 2, and the user 2 receives two feedbacks from the user 1.

The edges in the graph model in FIG. 3B indicate the exchange of feedbacks between the users 1 to 3 and thus contain information suitable for the user ranking calculation based on the reputation. Accordingly, the user ranking can be obtained by applying the random walk-based user ranking algorithm and the HITS-based algorithm to the graph model.

On the assumption that a score measured based on the reputation of a user v is indicated by $RR(v)$ and the number of feedbacks given to each of users $u_1, \ldots, u_i, \ldots, u_k$ of k-number by the user v is indicated by $F_{v \to u_i}$, a score of the user $u_i$ who receives a feedback from the user v is calculated by the following Eq. 1.

$$\frac{F_{v \to u_i}}{\sum_{u_j} F_{v \to u_j}} RR(v) \qquad \text{Eq. 1}$$

Thus, a random walk-based user score is calculated by the following Eq. 2.

$$RR(u) = d^* \sum_v \frac{F_{v \to u}}{\sum_w F_{v \to w}} RR(v) + (1-d) \qquad \text{Eq. 2}$$

Herein, $RR(u)$ represents a score of a user u;

$$\sum_v \frac{F_{v \to u}}{\sum_w F_{v \to w}} RR(v)$$

represents a score of the user u who receives a feedback from the user v; and d represents a decay factor (damping factor) ranging between 0 and 1.

The above Eq. 1 can also be applied to calculation of a HITS-based user score. Especially, an authority-based user score $RR_{authority}(u)$ is calculated by the following Eq. 3.

$$RR_{authority}(u) = \sum_v \frac{F_{v \to u}}{\sum_w F_{v \to w}} RR_{hub}(v) \qquad \text{Eq. 3}$$

Meanwhile, when the above Eq. 1 is used to calculate the HITS-based user score, a hub-based user score $RR_{hub}(u)$ is calculated by the following Eq. 4.

$$RR_{hub}(u) = \sum_v \frac{F_{v \to u}}{\sum_w F_{v \to w}} RR_{authority}(v) \quad \text{Eq. 4}$$

A HITS-based user's final score can be calculated by the following Eq. 5.

$$RR(u) = a*RR_{authority}(u) + (1-a)*RR_{hub}(u), (0 \le a \le 1) \quad \text{Eq. 5}$$

After the scores of all users are determined by Eq. 5, the user ranking can be calculated by the score ranking.

The user grouping unit 222 classifies users into groups based on the user ranking result obtained by the user ranking process of the user ranking unit 220. Among a uniform classification method, an exponential classification method and the like, the exponential classification method is used in the embodiment of the present invention. Even when any user group classification method among the above-described method is used, the sequence model based on the feedback can be obtained.

The user rank result obtained by the random walk-based or the HITS-based user ranking method generally complies with a power law. In other words, as the user score is increased, the number of users in each score range is decreased by geometric progression. Hence, the number of users with high scores is very small, whereas the number of users with low scores is quite large. On the assumption that x indicates a user score and y indicates the number of users, the relationship therebetween can be expressed by the following Eq. 6.

$$y \approx x^{-k} \quad \text{Eq. 6}$$

Here, k indicates a constant that can be varied in accordance with distribution. If a log is applied to both sides of Eq. 6, an inversely proportional line having an inclination of k is obtained.

Figure 4:
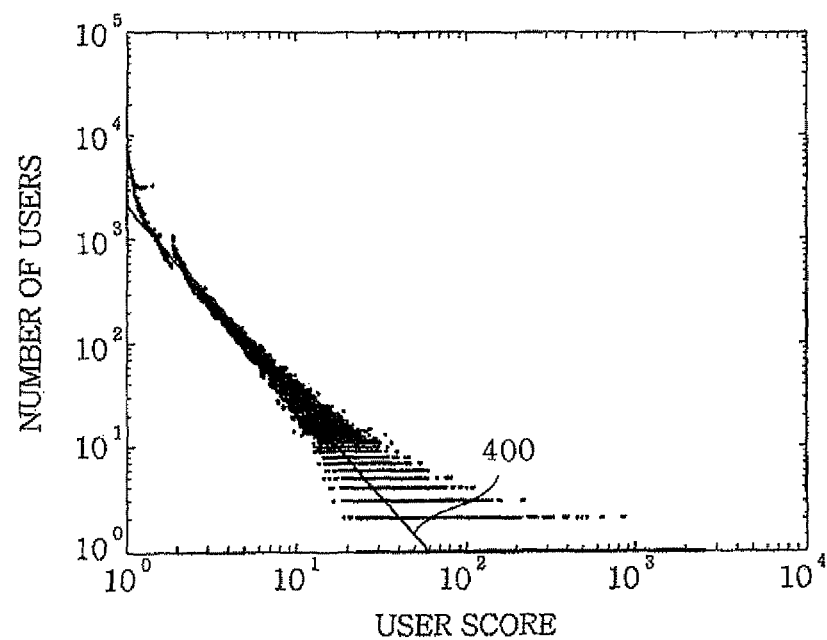
FIG. 4 shows a graph illustrating a graph showing a distribution of the number of users with respect to user scores among user groups in a database in accordance with the embodiment of the present invention.

FIG. 4 is a graph showing a distribution of the number of users with respect to user scores among user groups in a database in accordance with the embodiment of the present invention.

Referring to FIG. 4, the x-axis and the y-axis respectively represent the user score and the number of users with respect to each user score in a log scale. This distribution is similar to that of a line 400 and complies with a power law.

Since the user score is inverse proportional to the number of users, the embodiment of the present invention proposes a calculation method for exponentially increasing an area of a user score range (hereinafter, referred to as a "bin") from a highest user group. This calculation method is described as follows.

On the assumption that M, m and N indicate a score of a highest ranked user, a score of a lowest ranked user, and the number of bins, respectively, a minimum value and a maximum value of a k-th bin can be defined as follows.

$$G_{k-min} = M\left(\frac{m}{M}\right)^{\frac{k}{N}} \quad \text{Eq. 7}$$

$$G_{k-max} = M\left(\frac{m}{M}\right)^{\frac{k-1}{N}} \quad \text{Eq. 8}$$

Therefore, the score of the user belonging to the k-th bin is determined to be greater than $G_{k-min}$ and smaller than $G_{k-max}$.

The sequence modeling unit 224 performs post sequence modeling by preference of ranked user groups. The modeling is performed based on the absolute or the relative quantity of feedbacks indicating to thereby measure the preference of the user groups ranked on the post.

First, the post modeling method using the absolute quantity of feedbacks will be described. The number of feedbacks given to a random post is varied in accordance with user groups. Thus, the preference of a specific user group on the post can be measured by comparing the number of feedbacks given from the respective user groups. In other words, a random post p can be defined as an N-dimensional sequence with the number of feedbacks given from user groups of N-number as in the following Eq. 9.

$$p = <fb(p, G_1), fb(p, G_2), \ldots, fb(p, G_N)> \quad \text{Eq. 9}$$

Here, $fb(p, G_k)$ indicates the number of feedbacks given to the post p by users in a user group $G_k$.

However, the absolute quantity of feedbacks from a specific user group does not accurately indicate the preference of the corresponding user group. This is because the number of users in the user groups may be different and the average number of feedbacks given by a user may be different in each user groups.

Hereinafter, the sequence modeling method using the relative number of feedbacks will be described.

Figure 5:
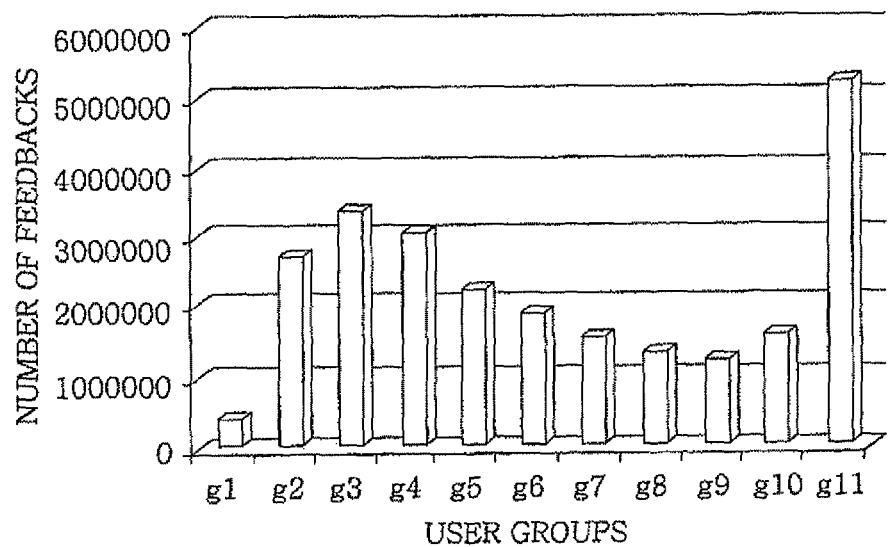
FIG. 5 shows a graph illustrating the total number of feedbacks given to all posts by user groups among database groups in accordance with an embodiment of the present invention.

FIG. 5 is a graph showing the number of feedbacks given to all posts by the user groups in database groups in accordance with an embodiment of the present invention.

Referring to FIG. 5, the number of feedbacks from one user group is different from the number of feedbacks from another user group. Hence, the embodiment of the present invention proposes a method for measuring relative preference of a specific user group on a certain post compared to another post. In other words, the average number of feedbacks per a single post from the users in the k-th group $G_k$ can be calculated by the following Eq. 10.

$$\mu_{fb}(G_k) = \frac{\sum_{p \in P} fb(p, G_k)}{n(P)} \quad \text{Eq. 10}$$

Here, $\mu_{fb}(G_k)$ indicates the average number of feedbacks per a post from the users in the $G_k$ group; $fb(p,G_k)$ indicates the number of feedbacks on the post p from the users in the $G_k$ group; and P indicates a set of entire posts.

Accordingly, the relative quantity of feedbacks on a random post p from the users in the $G_k$ group can be calculated by the following Eq. 11.

$$rfb(p, G_k) = \frac{fb(p, G_k)}{\mu_{fb}(G_k)} \quad \text{Eq. 11}$$

If $rfb(p,G_k)$ is greater than 1, it is determined that the number of feedbacks on the post p from the k-th user group is greater than the average number of feedbacks to other posts and also that the post p is preferred more than average by the $G_k$ user group. On the other hand, if it is smaller than 1, it is determined that the number of feedbacks on the post p from the k-th user group is smaller than the average number of feedbacks to other posts and also that the post p is preferred less than average by the $G_k$ user group.

Hence, by applying Eq. 11, a random post can be expressed as a sequence using the relative number of feedbacks. In other words, on the assumption that N indicates the number of ranked user groups, the random post p can be defined as a sequence of N-dimensional relative feedbacks as in the following Eq. 12.

$$p = <rfb(p,G_1), rfb(p,G_2), \ldots, rfb(p,G_N)>$$ Eq. 12

The post similarity calculation unit 226 for measuring similarity between sequences calculates similarity between posts in order to retrieve similar posts or cluster posts. Here, if two posts are similar to each other, the two posts have similar preference tendencies from different user groups. For example, when two posts are more preferred by high-ranked user groups than by low-ranked user groups or vise versa, it is determined that two posts are similar to each other.

In the sequence modeling unit 224, each post is modeled as a sequence indicating a relative quantity of feedbacks from a user group. In the post similarity calculation unit 226, similarity between sequences is measured by calculating an Euclidean distance while considering two sequences as vectors.

The distance between N-dimensional sequences $S_1 = <a_1, \ldots, a_N>$ and $S_s = <b_1, \ldots, b_N>$ can be calculated by the following Eq. 13.

$$\text{sequence\_distance}(S_1, S_2) = \sqrt{\sum_{i=1}^{N}(S_1 a_i - S_2 b_i)^2}$$ Eq. 13

As the distance between sequences is increased in Eq. 13, two posts are determined to have low similarity. As the distance between sequences is decreased, two posts are determined to have high similarity.

However, when the similarity between posts is defined as a similarity of preference tendencies from different user groups, the Euclidean distance between two sequences may not accurately reflect the relative preference tendencies among user groups, i.e., similarity between sequence trajectories.

In addition to the method for calculating the Euclidean distance between sequences indicating posts, the similarity between sequences can also be determined by measuring angles between sequences. In other words, cosine similarity between N-dimensional sequences $S_1 = <a_1, \ldots, a_N>$ and $S_2 = <b_1, \ldots, b_N>$ is calculated by the following Eq. 15.

$$\text{cosine\_similarity}(S_1, S_2) = \frac{\sum_{i=1}^{N} S_1 a_i \times S_2 b_i}{\sqrt{\sum_{i=1}^{N} S_1 a_i^2} \times \sqrt{\sum_{i=1}^{N} S_2 b_i^2}}$$ Eq. 15

As the value obtained by Eq. 15 is increased, two posts are determined to have more similarity.

The method for measuring similarity between sequences is not limited to the above, and other various methods known to those who skilled in the art can be used.

Figure 6A:
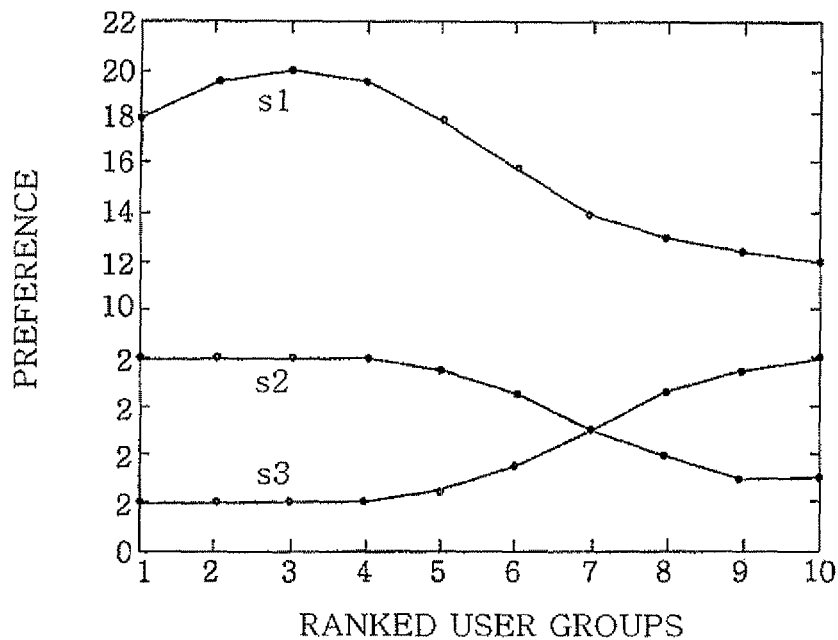
FIGS. 6A and 6B show original and normalization execution graphs of three sequences in accordance with an embodiment of the present invention.
Figure 6B:
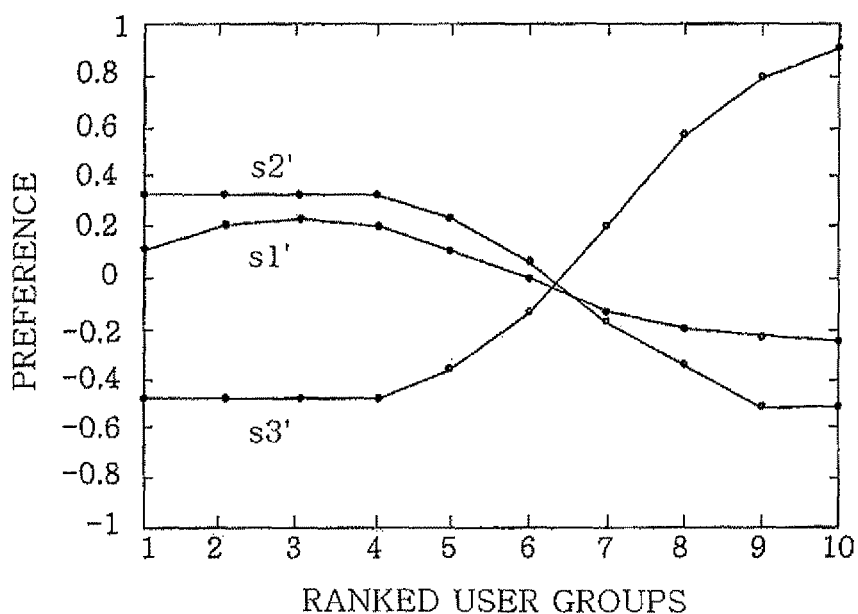

FIGS. 6A and 6B are original and normalized graphs of three sequences s1 to s3 in accordance with the embodiment of the present invention, and the x-axis indicates ranked user groups, and the y-axis indicates preference of the ranked user groups.

Referring to FIG. 6A, it is intuitively clear that a sequence_distance (s1,s2) is greater than a sequence_distance (s3,s2). In other words, it is determined that s2 is more similar to s3 than to s1. However, s1 and s2 are more preferred by the high-ranked user group than by the low-ranked user group, whereas s3 is more preferred by the low-ranked user group than by the high-ranked user group. Therefore, as shown in the normalized graph of FIG. 6B, s2' is actually more similar to s1' than to s3'.

This is because there exists the difference in the element distribution of respective sequences. To that end, the embodiment of the present invention suggests a sequence normalization method using a maximum value and a minimum value and a sequence normalization method using a preference threshold value.

First, the sequence normalization method using a maximum value and a minimum value will be described. A maximum value and a minimum value in the elements of the sequence $S = <a_1, \ldots, a_N>$ can be calculated by the following Eq. 15.

$$\text{min\_value} = \min_{i=1,\ldots,N} a_i$$ Eq. 15
$$\text{max\_value} = \max_{i=1,\ldots,N} a_i$$

On the assumption that the normalized sequence is indicated by $S' = <a_1', \ldots, a_N'>$, $a_i$ is converted into an i-th component $a_i'$ of the normalized sequence as in the following Eq. 16.

$$a_i' = \frac{a_i - \text{min\_value}}{\text{max\_value} - \text{min\_value}}$$ Eq. 16

The calculation using a log is described as in the following Eq. 17.

$$a_i' = \frac{\log_2(a_i + 1) - \log_2(\text{min\_value} + 1)}{\log_2(\text{max\_value} + 1) - \log_2(\text{min\_value} + 1)}$$ Eq. 17

In the sequence normalization method using a preference threshold value, when the i-th element $a_i$ of the sequence $S = <a_1, \ldots, a_N>$ is smaller than 1, the post is less preferred than a post preferred on average by the corresponding user group. On the contrary, when $a_i$ is greater than 1, the post is more preferred than a post preferred on average by the corresponding user group.

When $a_i$ is equal to 1, the post is preferred on average by the corresponding user group. Thus, there is required a method for normalizing a sequence by distinguishing when the preference threshold value is smaller than 1 and when the preference threshold value is larger than 1. When the entire range of the normalization result is set to [−1,1], values originally smaller than 1 are abstracted within [−1,0] and values originally greater than 1 are abstracted within [0,1]. As a result, the normalized value $a_i'$ of the i-th element $a_i$ of the sequence $S = <a_1, \ldots, a_N>$ can be calculated by the following Eq. 18.

$$a_i' = \begin{cases} a_i - 1 & (a_i \le 1) \\ \dfrac{a_i - 1}{\text{max\_value} - 1} & (a_i > 1) \end{cases}$$ Eq. 18

The calculation using a log is described as in the following Eq. 19.

$$a'_i = \begin{cases} a_i - 1 & (a_i \leq 1) \\ \dfrac{\log_2(a_i + 1) - 1}{\log_2(\max\_value + 1) - 1} & (a_i > 1) \end{cases} \quad \text{Eq. 19}$$

As described above, the conversion of the posts into sequences which is performed by the contents similarity measuring apparatus 200 and the similarity measured between the sequences can be applied to the similar post retrieval unit 228 for retrieving similar posts, the post clustering unit 230 for clustering posts by using a division-based clustering algorithm or an agglomerative hierarchical clustering algorithm, and the post classification unit 232 for classifying posts based on the preference of the ranked user groups.

Specifically, when a random post is given as a query, the similar post retrieval unit 228 retrieves a most similar post. If the post is similar to the query post, the user group who prefers the post is similar to a user group preferring the query post. The following Table 1 is an example of the similar post retrieval algorithm.

TABLE 1

Algorithm FindSimiarPosts input:
$P_q$: query post
k: the number of similar posts
$P = \{p_1,..., p_N\}$, where each $P_i$ is represented as an
m dimensional sequence
$\langle a_{i1},..., a_{im} \rangle$ //N=the number of posts, m=the number
of user groups
Output:
K similar posts.
begin
    initialize post_distance[N];
    for each $p_i$ in P do {
        post_distance[$p_i$] ← sequence_distance($p_q$,$p_i$);
    }
    R <− Sort P in order of post_distance[ ];
    Return top k posts in R;
end The post clustering unit 230 clusters posts by using various methods such as the division-based clustering algorithm, the agglomerative hierarchical clustering algorithm and the like.

A majority selection clustering algorithm creates a cluster on a user group which represents a variety of user groups. That is, a post is assigned to a cluster of a user group having a largest relative quantity of feedbacks (i.e., preference). The relative quantity of feedbacks of a specific user group can be calculated based on the method for modeling a post as an N-dimensional sequence which is suggested in the embodiment of the present invention. The following Table 2 is an example of the majority selection clustering algorithm.

TABLE 2

Algorithm Majority_Selection
input:
$P = \{p_1, ..., p_N\}$, where each $p_i$ is represented as an m
dimensional sequence
$\langle a_{i1}, ..., a_{im} \rangle$ //N=the number of posts, m=the number
of user groups.
output:
$R = \{C_1, ..., C_M\}$; //m post clusters
begin
    for each post $p_i$, do{

TABLE 2-continued major_cls ← $\arg\max\limits_{j=1,...,m} p_i \cdot a_{ij}$;
        $C_{major\_cls} \leftarrow C_{major\_cls} \cup \{p_i\}$;

Return R;
end

The K-means clustering method performs post clustering by using a k-means algorithm based on similarity between sequences indicating posts. The K-means algorithm assigns a post to a cluster containing a closest centroid. In the embodiment of the present invention, a contents similarity measuring method is used to calculate a distance between a post and a centroid. The following Table 3 is an example of the K-means clustering algorithm.

TABLE 3

Algorithm K-Means input:
$P = \{p_1,..., p_N\}$, where each $p_i$ is represented as an m
dimensional sequence
$\langle a_{i1},..., a_{im} \rangle$ //N = the number of posts, m = the number of
user groups.
output:
$R = \{C_1,..., C_k\}$; //k post clusters
begin
    select k posts as seed centroids;
    repeat {
        generate k clusters by assigning each post to its
closest centroid;
        recomputed the centroid of each cluster;
    } until (centroids do not change);
    return R;
end The agglomerative hierarchical clustering (AHC) algorithm initializes posts as clusters and repeats merging closest two clusters until the closest two clusters are within a specific threshold distance. The contents similarity method suggested in the embodiment of the present invention is used to measure a distance between two posts, i.e., two clusters. The following Table 4 is an example of the agglomerative hierarchical clustering algorithm.

TABLE 4

Algorithm AHC input:
$P = \{p_1,..., p_N\}$, where each $p_i$ is represented as an m
dimensional sequence
$\langle a_{i1},..., a_{im} \rangle$ //N = the number of posts, m = the number of
user groups.
distance_threshold.
output:
R = a set of clusters;
begin
    initialize R to contain each post as a cluster;
    repeat {
        merge the closest two clusters in R;
    } until (closest two clusters are within
distance_threshold);
    return R;
end Further, the post classification unit 232 classifies posts based on the preference of the ranked user groups. Although the preference of the ranked user groups may have a large number of patterns, the patterns occurring frequently in accordance with application or the patterns suitable for application can be classified. In the embodiment of the present invention, the following user patterns are suggested as representative examples.

High expertise posts: posts that are relatively more preferred by a high-ranked user group High popularity posts: posts that are relatively more preferred by a middle- and low-ranked user group High expertise and high popularity posts: posts that are preferred by a high-ranked user group and a middle- and low-ranked user group in a similar degree Lowbrow posts: posts that are preferred not by a high-ranked user group but highly preferred by a low-ranked user group In the post classification unit 232, a preference pattern suitable for application is specified by a contents classification application program. Further, an algorithm and a technique for distinguishing a post suitable for the specified pattern and a post unsuitable for the specified pattern are developed and applied to the contents classification.

Figure 7:
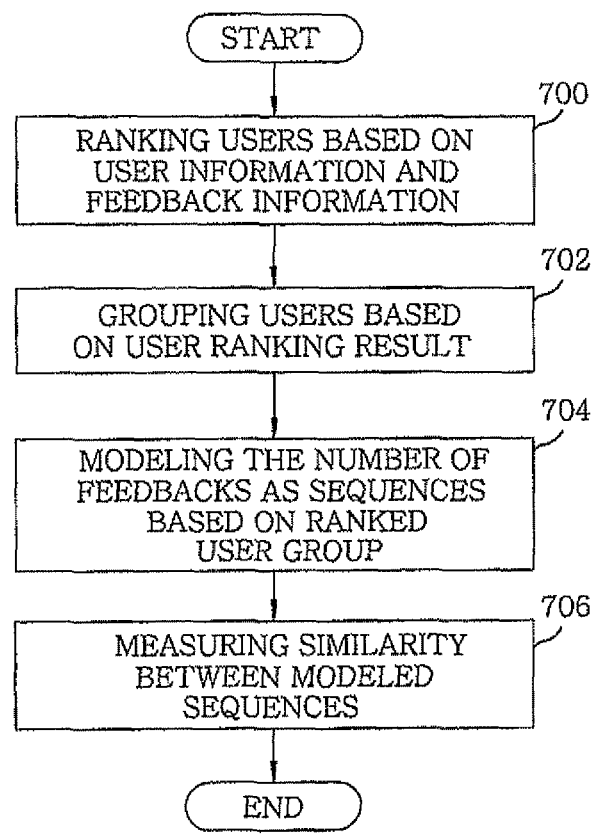
FIG. 7 is a flowchart illustrating an operation sequence of a contents similarity measuring apparatus in accordance with an embodiment of the present invention.

FIG. 7 is a flowchart showing an operation sequence of the contents similarity measuring apparatus in accordance with the embodiment of the present invention.

Referring to FIG. 7, in step 700, the user ranking unit 220 in the contents similarity measuring apparatus 200 receives the user information 202 and the feedback information 206 from the database 210 and ranks users based on the received information.

In step 702, the user ranking result is transmitted to the user grouping unit 222. The user grouping unit 222 classifies users into various groups.

In step 704, the sequence modeling unit 224 prefers sequence modeling the number of feedbacks on each post based on a ranked user group.

In step 706, the post similarity calculation unit 226 measures similarity between the modeled sequences. The measured similarity is transmitted to the similar post retrieval unit 228, the post clustering unit 230, and the post classification unit 232. Accordingly, the similar post retrieval, the post clustering, and the contents classification based on the preference of the ranked user groups can be carried out.

The contents similarity measuring apparatus 200 can be applied to various online networks where users communicate with each other.

(1) blog read post, comment, scrap, link, vote or the like (2) online forum read post, reply, comment, vote, blame or the like (3) online social network read post, reply, comment, vote, blame, link or the like on Facebook, Myspace, Cyworld mini homepage, LinkedIn or the like (4) video, image, music download site read post, reply, comment, vote, blame, link or the like on Flickr, YouTube, Daum tv pot or the like (5) news read news/comment/vote/blame on news comment/vote/blame on comment on news (6) shopping mall view item/comment/vote/blame/rating/purchase/review or the like As described above, the present invention measures similarity between posts by modeling a random post as a sequence based on a user rank basis preference trend.

While the invention has been shown and described with respect to the embodiments, it will be understood by those skilled in the art that various changes and modification may be made without departing from the scope of the invention as defined in the following claims.

What is claimed is:

1. An apparatus for measuring contents similarity based on feedback information from ranked users, comprising:

at least one processor to provide:

a user ranking unit configured to receive from a database information on users as contents creators and feedback information on posts as contents and rank the users based on the received information;

a user grouping unit configured to classify the users into a plurality of ranked user groups based on the ranking result;

a sequence modeling unit configured to obtain feedbacks from the plurality of ranked user groups and model the contents as sequences of data points based on the feedbacks, each of said data points comprising a preference for the contents of one of said posts as a function of a group ranking of a respective said user group; and a post similarity calculation unit configured to measure similarity between the modeled sequences to obtain similarity of the posts.

2. The apparatus of claim 1, wherein the user ranking unit calculates the user ranking based on a random walk-based algorithm or a HITS (Hyperlink-Induced Topic Search)-based algorithm.

3. The apparatus of a ranked user of claim 1, wherein the user grouping unit classifies the users into the plurality of ranked user groups by using an exponential classification method.

4. The apparatus of claim 1, wherein the sequence modeling unit models preference of the ranked user groups on each post based on an absolute quantity of the feedbacks as in a following equation:

$$p = <fb(p,G_1), fb(p,G_2), \ldots, fb(p,G_N)>,$$

wherein $fb(p, G_k)$ indicates the number of the feedbacks on a post p from user s in a user group $G_k$.

5. The apparatus of claim 1, wherein the sequence modeling unit models preference of the user groups on each post based on a relative quantity of the feedbacks as in a following equation:

$$rfb(p, G_k) = \frac{fb(p, G_k)}{\mu_{fb}(G_k)}$$

$$p = <fb(p, G_1), fb(p, G_2), \ldots, fb(p, G_N)>,$$

wherein $\mu fb(G_k)$ indicates an average number of the feedbacks per a post from all users in a user group $G_k$, and $fb(p,G_k)$ indicates the number of the feedbacks on a post p from all users in the user group $G_k$.

6. The apparatus of claim 1, wherein the post similarity calculation unit calculates cosine similarity or an Euclidean distance while setting the sequences as vectors and performs sequence normalization using a maximum value and a minimum value as in a following equation:

$$a'_i = \frac{\log_2(a_i + 1) - \log_2(\min\_value + 1)}{\log_2(\max\_value + 1) - \log_2(\min)value + 1)},$$

wherein a maximum value and a minimum value in elements of a sequence $S_1 = <a_1, \ldots, a_N>$ are indicated by $$\text{max\_value} = \max_{i=1,\ldots,N} a_i$$

and $$\text{min\_value} = \min_{i=1,\ldots,N} a_i,$$

respectively, an i-th element in a normalized sequence $S_1'=\langle a_1', \ldots, a_N'\rangle$ is indicated by $a_i'$, where $N>1$.

7. The apparatus of claim 1, wherein the post similarity calculation unit calculates cosine similarity or an Euclidean distance while setting the sequences as vectors and performs sequence normalization using a preference threshold value as in a following equation:

$$a_i' = \begin{cases} a_i - 1 \\ \dfrac{\log_2(a_i+1)-1}{\log_2(\text{max\_value}+1)-1} & (a_i \le 1) \\ & (a_i > 1) \end{cases},$$

wherein a maximum value and a minimum value in elements of a sequence $S_1=\langle a_1, \ldots, a_N\rangle$ are indicated by $$\text{max\_value} = \max_{i=1,\ldots,N} a_i$$

and an i-th element in a normalized sequence $S_1'=\langle a_1', \ldots, a_N'\rangle$ is indicated by $a_i'$, where $N>1$.

8. The apparatus of claim 1, further comprising:
a similar post retrieval unit for retrieving a post similar to a random post by using similarity between the posts measured by the post similarity calculation unit;
a post clustering unit for clustering the posts based on the number of feedbacks on the posts and the similarity between the posts by using at least one of a majority selection clustering algorithm, a K-means clustering algorithm and an agglomerative hierarchical clustering (AHC) algorithm; and
a post classification unit for classifying the posts based on preference of the ranked user groups.

9. A method for measuring contents similarity based on feedback information of ranked users, comprising:
receiving, by a processor, information on users as contents creators and feedback information on posts as contents from a database of a contents similarity measuring apparatus and ranking the users based on the received information;
classifying, by a processor, the users into a plurality of ranked user groups based on the ranking result;
obtaining feedbacks from the plurality of ranked user groups and modeling, by a processor, the contents as sequences of data points based on the feedbacks, each of said data points comprising a preference for the contents of one of said posts as a function of a group ranking of a respective said user group; and
measuring, by a processor, similarity between the modeled sequences to obtain similarity between the posts.

10. The method of claim 9, wherein in said ranking, the user ranking is calculated based on a random walk-based algorithm or a HITS (Hyperlink-Induced Topic Search)-based algorithm.

11. The method of claim 9, wherein in said classifying, the users are classified into the ranked user groups by using an exponential classification method.

12. The method of claim 9, wherein in said modeling, preference of the user groups on each post is modeled based on an absolute quantity of the feedbacks as in a following equation:

$$p = \langle fb(p,G_1), fb(p,G_2), \ldots, fb(p,G_N)\rangle,$$

wherein $fb(p, G_k)$ indicates the number of the feedbacks on a post p from user in a user group $G_k$.

13. The method of claim 9, wherein in said modeling, preference of the user groups on each post is modeled based on a relative quantity of the feedbacks as in a following equation:

$$rfb(p, G_k) = \frac{fb(p, G_k)}{\mu_{fb}(G_k)}$$

$$p = \langle fb(p, G_1), fb(p, G_2), \ldots, fb(p, G_N)\rangle,$$

wherein $\mu_{fb}(G_k)$ indicates an average number of the feedbacks per a post from all users in a user group $G_k$, and $fb(p,G_k)$ indicates the number of the feedbacks on a post p from all users in the user group $G_k$.

14. The method of claim 9, wherein in said measuring similarity, an Euclidean distance is calculated while setting the sequences as vectors, and sequence normalization using a maximum value and a minimum value is performed as in a following equation:

$$a_i' = \frac{\log_2(a_i+1) - \log_2(\text{min\_value}+1)}{\log_2(\text{max\_value}+1) - \log_2(\text{min\_value}+1)},$$

wherein a maximum value and a minimum value in elements of a sequence $S_1=\langle a_1, \ldots, a_N\rangle$ are indicated by $$\text{max\_value} = \max_{i=1,\ldots,N} a_i$$

and $$\text{min\_value} = \min_{i=1,\ldots,N} a_i,$$

respectively, and an i-th element in a normalized sequence $S_1'=\langle a_1', \ldots, a_N'\rangle$ is indicated by $a_i'$, where $N>1$.

15. The method of claim 9, wherein in said measuring similarity, an Euclidean distance is calculated while setting the sequences as vectors, and sequence normalization using a preference threshold value is performed as in a following equation:

$$a_i' = \begin{cases} a_i - 1 \\ \dfrac{\log_2(a_i+1)-1}{\log_2(\text{max\_value}+1)-1} & (a_i \le 1) \\ & (a_i > 1) \end{cases},$$

wherein a maximum value and a minimum value in elements of a sequence $S_1=\langle a_1, \ldots, a_N\rangle$ are indicated by $$\mathrm{max\_value} = \max_{i=1,\ldots,N} a_i$$

and an i-th element in a normalized sequence $S_1'=\langle a_1',\ldots,a_N'\rangle$ is indicated by $a_i'$, where $N>1$.

16. The method of claim 9, further comprising retrieving a post similar to a random post by using the similarity between the posts measured by a post similarity calculation unit.

17. The method of claim 9, further comprising clustering the posts based on the number of feedbacks and the similarity between the posts measured by a post similarity calculation unit by using at least one of a majority selection clustering algorithm, a K-means clustering algorithm, and an agglomerative hierarchical clustering (AHC) algorithm.

18. The method of claim 9, further comprising classifying the posts based on preference of the ranked user groups.

19. A computing device storing a program for performing a method for measuring contents similarity via a wire/wireless communication network, the program including stored instructions executable by the computing device for:

receiving information on users as contents creators and feedback information on posts as contents from a database of a contents similarity measuring apparatus and ranking the users based on the received information;

classifying the users into a plurality of ranked user groups based on the ranking result;

obtaining feedbacks from the plurality of ranked user groups and modeling the contents as sequences of data points based on the feedbacks, each of said data points comprising a preference for the contents of one of said posts as a function of a group ranking of a respective said user group; and measuring similarity between the modeled sequences to obtain similarity between the posts.

* * * * *